Nov. 10, 1964     G. A. CROWE, JR     3,156,242

FLEXIBLE ABSORBENT SHEET

Filed March 29, 1962

INVENTOR
GEORGE A. CROWE JR.
BY
ATTORNEY 3,156,242
FLEXIBLE ABSORBENT SHEET
George A. Crowe, Jr., Plainfield, N.J., assignor to Johnson & Johnson, a corporation of New Jersey
Filed Mar. 29, 1962, Ser. No. 183,484
1 Claim. (Cl. 128—296)

The present invention relates to surgical dressings and method of making the same.

Synthetic cellular sponge materials of varying types are presently available on the market. Many of these are quite soft and resilient and make excellent padding materials. However, many of the softer, more flexible and resilient cellular sponge materials, such, for example, as flexible and resilient sponges formed of polyurethane esters and polyurethane ethers, as, for example, described in U.S. Patent 2,956,310, or other foamable cellular sponge-forming polymeric materials as nylon, rubber, polyethylene, and polyvinyl chloride are hydrophobic in nature and will not readily absorb fluids with which they are placed in contact. In copending application Ser. No. 159,117, filed December 13, 1961, now abandoned absorbent sheet materials are described which comprise sheets of resilient, flexible, hydrophobic sponge materials which contain hydrophilic fibers which are uncoated by the material of the sponge and extend from at least one surface of the sheet of cellular sponge material well down into the main body thereof. These fibers act to draw fluids from the surface of the sponge sheet into the main body thereof as hereinafter more fully described. When the fibers pass completely through the sheet of sponge material, the fibers also act to draw aqueous-base fluids completely through the sponge sheet where the fluids can then be absorbed by any absorbent surface provided on the other side.

These materials may be used for any purpose where a resilient, highly absorbent sheet material is needed. However, materials of this type are particularly useful in the preparation of surgical dressings and the like.

In the treatment of wounds, it is generally desirable to protect the wound with a protective covering that will draw wound exudate away from the wound surface and will, at the same time, form a protective cushion over the wound. Where the wound is of such nature that there is copious wound exudate, heavy gauze dressings formed of many layers of gauze are generally used in order to remove and absorb such exudate so as to keep the wound area free of the same. Resilient, flexible, synthetic sponge materials of the type referred to when used to cover a wound will provide an excellent cushioning protective cover. However, such materials do not satisfactorily remove fluids from an underlying surface with which they are placed in contact and are, accordingly, unsuitable for use as dressing materials in place of the conventional gauze or other absorbent dressings. By providing in the sheet of synthetic cellular sponge material numerous hydrophilic fibers extending from the surface of such sponge into the main body thereof, even though the sponge material itself may be highly hydrophobic, such hydrophilic fibers act to rapidly draw fluids from the surface of the sponge sheet into the cellular sponge material, much of the fluid being deposited in the cellular structure through which the absorbent hydrophilic fibers pass.

In making such absorbent cellular sheet materials, a layer or web of absorbent fibers is placed on one surface of a sheet of cellular sponge material, and the sponge sheet with the fiber web thereon is then needled by passing barbed needles down through the web of fibers into the sponge sheet to force a portion of the fibers, in the form of fiber bundles, through the main body of the underlying sponge. These fibers passing from the fiber web down through the sheet of sponge material not only serve to draw fluid into the sponge body but also serve to mechanically interlock the absorbent fiber web with the cellular sponge sheet and thus hold the fiber web in intimate contact with the adjacent cellular sponge material. Where the needled fibers pass completely through the sheet of cellular sponge material, even though the sponge material itself may be fairly strongly hydrophobic in nature, aqueous-base fluids which contact the side of the sponge sheet opposed to the side containing the fiber layer are rapidly drawn up into and through the sheet of sponge material. Some of the fluid remains in the cells in the sponge material adjacent the needled fibers passing through the same. However, most of the fluid is drawn on through the sponge and spread laterally through the web of hydrophilic fibers on the sponge surface. As a result the upper surface of the dressing takes on an unsightly appearance. This unsightly appearance is avoided by placing over the web of fibers an opaque, flexible, nonabsorbent film of film-forming material, such, for example, as plasticized polyvinyl chloride. The film should preferably be air-pervious so as to permit drying of the fiber web beneath the same. Accordingly, in the preferred practice of the present invention, the film used either is air-pervious by nature, such as microporous film, or has had holes or slits formed in the same.

For the hydrophilic fibers any hydrophilic fibers may be used that can be placed in the cellular sponge sheet so as to extend from a surface of the sheet down into the sponge body. In using the term "hydrophilic fibers," those fibers or filaments, including continuous filaments, are included which have the natural property of moving aqueous fluids along their length by capillary action, either as single fibers or as fiber bundles, as well as these fibers and filaments which, although normally are not wetted by water, have been treated so as to make the same readily wettable so that they will move aqueous fluids along their surface. It is generally preferred to use cellulosic fibers, such as the natural cellulosic fibers including cotton, ramie, jute, hemp, and bagasse, and the synthetic cellulosic fibers, such as those formed of regenerated cellulose and cellulose acetate.

Any cellular, hydrophobic sponge material may be used that is sufficiently flexible and resilient for the purpose intended. It is generally preferred to use sponges formed of polyurethane polyesters, polyurethane polyethers, nylon, polyethylene, rubber, polyvinyl chloride, and formalinized polyvinyl alcohol, or other materials which will remain resilient and flexible without the need of added plasticizers. However, the invention is not limited thereto, and plasticized sponges may be used in practicing the same. In general, particularly where the material is to be used for surgical dressings, the sponge should be readily flexible and conforming in sheets of about $\frac{1}{32}$ to 1 inch thickness and should be soft and resilient in nature. The material should be sufficiently flexible and conforming to fit over body contours and be sufficiently soft and resilient to act as a protective cushion without irritation, as would a stiff sponge structure. Accordingly, it is generally desired that the sponge material, where the products of the present invention are to be used in dressings, have a flexibility of 17–74 percent of original thickness and a resiliency of 78–98 percent of original thickness. The flexibility and resiliency are measured in the following manner. The original thickness is measured with a micrometer having a dead weight of 56.7 grams per square inch of sample. A 500 gram weight is added, and the thickness is read after 60 seconds to find flexibility. The 500 gram weight is removed and after 60 seconds the thickness is read to find resiliency. Results are expressed in terms of percentage of original thickness.

Although the present invention is not limited to the use of sponge materials that have an open cellular structure, and sponge materials having closed cellular structures may be employed, it is generally preferred that the cellular sponge material used has sufficient open cells that the same will not restrict the passage of air therethrough. Where the sponge material has such open and connecting cellular structure, air can readily reach the surface of a wound to help in the healing of the same.

In order to further illustrate the invention, reference is made to the drawings wherein are set forth by way of illustration and example certain embodiments thereof.

Referring to the drawings.

Figure 1:
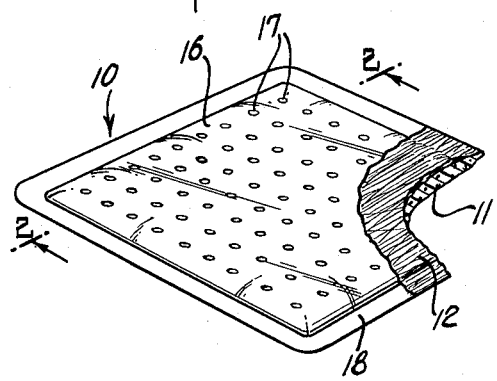
FIG. 1 is a perspective view of a drawing of the present invention with a portion thereof broken away.
Figure 3:
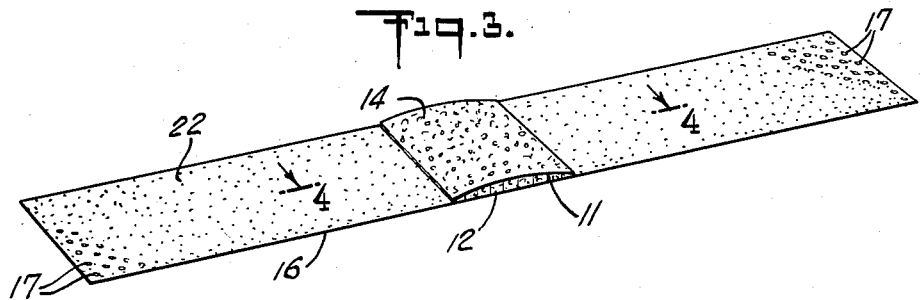
FIG. 3 is a perspective view of an adhesive bandage made in accordance with the present invention.

Referring to the drawings, in the dressings 10 and 19, illustrated respectively in FIGS. 1 and 3, the dressings are a composite laminate in which 11 is a flexible sheet of cellular sponge material and 12 is a web of relatively long hydrophilic fibers, such, for example, as cotton or rayon textile fibers. Some of the fibers of the fiber web 12 have been forced down through the sheet 11 of sponge material. These fibers or fiber bundles 13 extend on down through the sponge sheet 11 and extend slightly through the opposite surface 14 as illustrated at 15. Covering the fiber web 12 is a nonabsorbent, flexible sheet or film 16 containing perforations 17. In the dressing 10 of FIG. 1, the flexible sheet 16 is of the same length and width as the underlying sponge sheet 11. In the embodiment shown, both the sponge sheet 11 and the film 16 are of thermoplastic material, such, for example, as polyurethane foam sponge for the sponge sheet and plasticized polyvinyl chloride film containing a flesh-colored pigment for the film sheet 16. The hole is combined by fusing, through heat and pressure around the edge, to form an edge seal 18. Although this is the preferred manner of forming the dressing, the same can be adhesively combined by a suitable flexible adhesive if desired.

Figure 2:
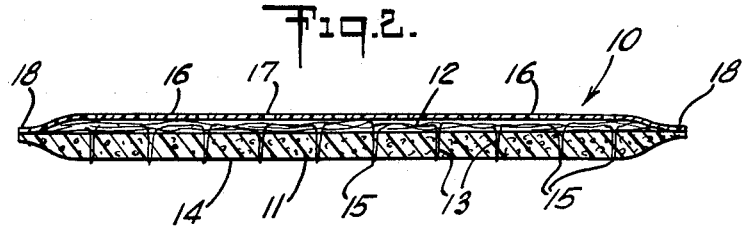
FIG. 2 is a cross-sectional view taken along line 2—2 of FIG. 1.
Figure 4:
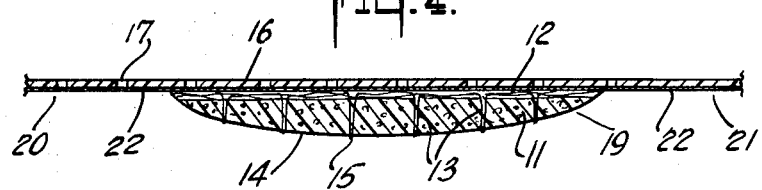
FIG. 4 is a cross-sectional view taken along line 4—4 of FIG. 3.

The fibers used in forming the fiber web 12 preferably have a fiber length of about 1 inch to 3 inches and a denier of about 1 to 10. The fibers of web 12 are pushed down into the sponge sheet 11 through the use of needles containing barbs thereon which catch the fibers and force the same down through the sponge sheet in somewhat of a U configuration, as best illustrated in FIGS. 2 and 4. In forming the product of FIGS. 1 and 3, it is generally preferred that there be at least 50 needle penetrations per inch. The downwardly extending fibers 13 not only serve to lock the fiber webs onto the sponge sheet 11 but also act to draw fluid into the sponge body so as to fill adjacent sponge cells.

With dressings such as illustrated in the drawings, when the side 14 opposed to the side which carries the fiber web 12 is contacted by an aqueous-base fluid, the exposed ends 15 of the fibers are wetted by the fluid and draw the fluid into the sponge sheet even though the sponge material itself is nonabsorbent in nature. In passing through the sponge sheet, some of the liquid flows into the adjacent cells, as previously indicated, while other liquid is conducted completely through the sponge sheet and absorbed in the fiber layer 12. The covering sheet 16, however, hides this fiber web from view so that the dressing still maintains a pleasing appearance although substantial blood or other body exudate has been absorbed in the fiber web 12. The covering sheet 16 also keeps the fibers of fiber web 12 clean and prevents the fibers of fiber web 12 from catching on clothes or other rough objects with which the dressing may come in contact while worn.

The dressing 19 illustrated in FIGS. 3 and 4 is an adhesive bandage. The dressing in structure is quite similar to that of FIGS. 1 and 2 and differs primarily in that the backing film 16 is substantially longer than the sponge sheet 11 extending on both sides of the same to provide tabs 20 and 21. The backing sheet is coated with a pressure-sensitive adhesive coating 22 to which the top surface of the fiber web 12 is secured, the adhesive extending over the whole backing strip 16. The adhesive bandage is provided with protective facing strips, not shown, in the conventional manner to protect the adhesive and the absorbent pad.

With the dressings as described, when the dressing is applied over a wound, fluids are rapidly drawn into the sponge sheet away from the surface of the skin. As air can pass through the dressing, both by way of the fibers 13 and because of the porous nature of the sponge material itself where such material is used, the skin under the dressing is kept relatively dry. At the same time, the dressing itself in contact with the skin feels relatively dry as compared with the conventional gauze bandages where the whole undersurface of the dressing becomes wetted and soggy.

The following specific example with respect to the manufacture of a dressing of the type illustrated by FIGS. 1 and 2 will help to further explain the invention. The example, however, is given for the purpose of illustration only and the invention is not limited thereto.

*Example*

A sheet of polyurethane foam is used as the cellular sponge material. This sheet has a thickness of ¼ inch, a flexibility of 71 percent, a resiliency of 98 percent and a resistance of air flow having a velocity of 24.7 feet per minute of 0.36 inch of water. A web of carded rayon fibers having a denier of 3 and a fiber length of 1 9/16 inches is placed on top of the foam sheet.

The sheet of polyurethane foam with the fiber web thereon is passed through a needling machine, each needle having 9 barbs. The needles are made to penetrate the foam sheet and web from the surface containing the web, the barbs on the needles being in such position as to draw fibers down through the foam sheet and act to bond the whole together and draw fluids into the same. This composite is flexible, resilient and highly absorbent. Over this structure is placed a sheet of perforated polyethylene film, the film being placed on top of the fiber web. The whole is then placed in a die designed to give a line pressure around what would be the edge of the finished dressing. The dressing is then subjected to a pressure of 70 pounds per square inch and temperature of 250° F. to make the seal. The dressing is then trimmed around the sealed edge.

Red-colored, aqueous-base fluid is placed on the side of the product opposite that containing the web of rayon fibers. The fluid is rapidly drawn up into the sponge sheet and spread through the web of rayon fibers. The stain in the fiber web, however, is hidden from view by the backing film. When the absorbent sheet product is cut through the center and examined, it is seen that fluid is also deposited in many of the cells in the sponge adjacent the rayon fibers which pass therethrough.

In describing the present invention, certain embodiments have been used, including the presently preferred embodiments, to illustrate the invention and the practice thereof. However, other embodiments and modifications within the spirit of the invention will readily occur to those skilled in the art on reading the same. The invention is accordingly not to be limited to the specific embodiments illustrated, these embodiments being used for illustration only, but is to be limited only in accordance with the claim appended hereto.

I claim:

A dressing comprising a facing formed of a flexible sheet of cellular hydrophobic heat softenable sponge material, a backing formed of a flexible opaque air-pervious sheet of heat softenable material, and a web of absorbent fibers disposed between said sponge facing and said backing, said backing being secured to said sponge facing around the edges thereof through fusion and fibers from said absorbent web extending through said sponge sheet facing to the opposite side thereof, whereby when the portion of said fibers extending through said sponge sheet are wetted said fibers act to draw fluid along their length up through said sponge sheet and into and through said absorbent fiber web, said opaque backing acting to hide said absorbed fluids from view.

References Cited in the file of this patent

UNITED STATES PATENTS

| | | |
|---|---|---|
| 2,429,486 | Reinhardt | Oct. 21, 1947 |
| 2,682,873 | Evans et al. | July 6, 1954 |
| 2,905,176 | Davidson | Sept. 22, 1959 |
| 2,916,037 | Hansen | Dec. 8, 1959 |
| 2,923,298 | Dockstader et al. | Feb. 2, 1960 |
| 2,972,350 | Deker | Feb. 21, 1961 |
| 3,025,854 | Scholl | Mar. 20, 1962 |
| 3,043,301 | Plantinga et al. | July 10, 1962 |